Aug. 23, 1966    S. I. MacDUFF ETAL    3,268,026
AUTOMOTIVE CRUISE CONTROL
Filed Dec. 26, 1962    7 Sheets-Sheet 1
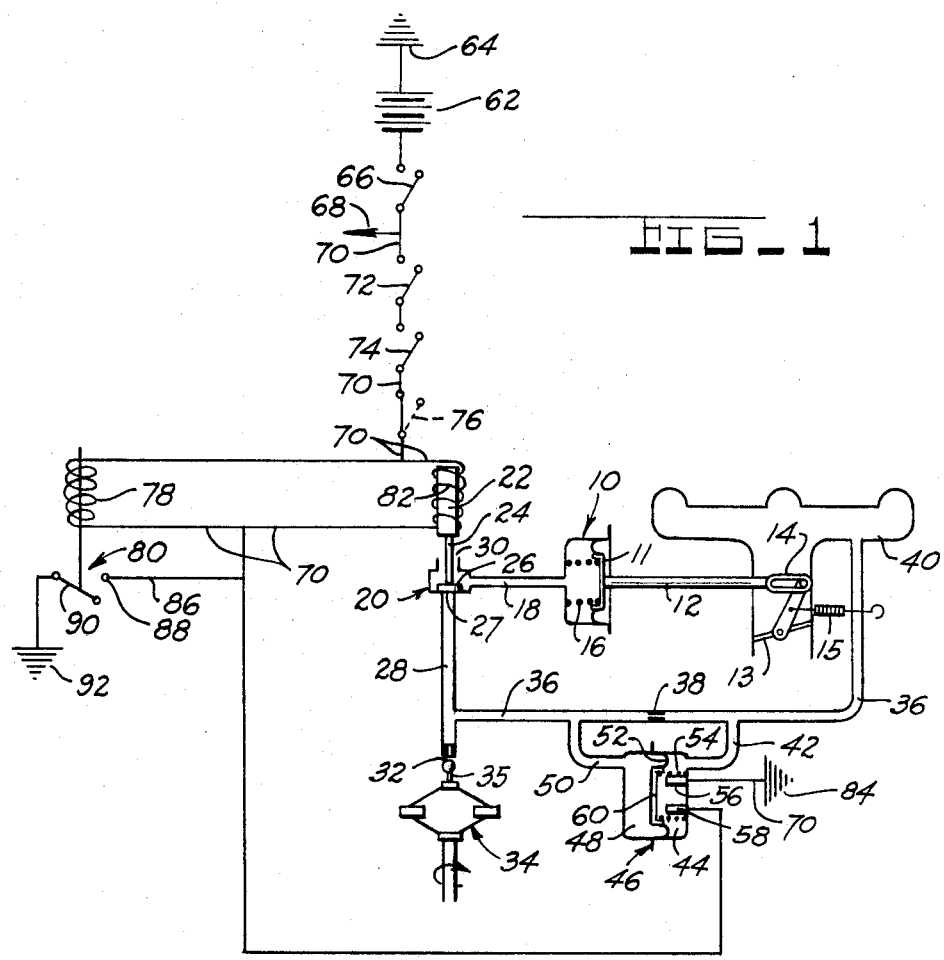
FIG_1
STANLEY I. MACDUFF
WARD C. SUTTLE.
INVENTORS
BY
William N. Antonis
ATTORNEY.

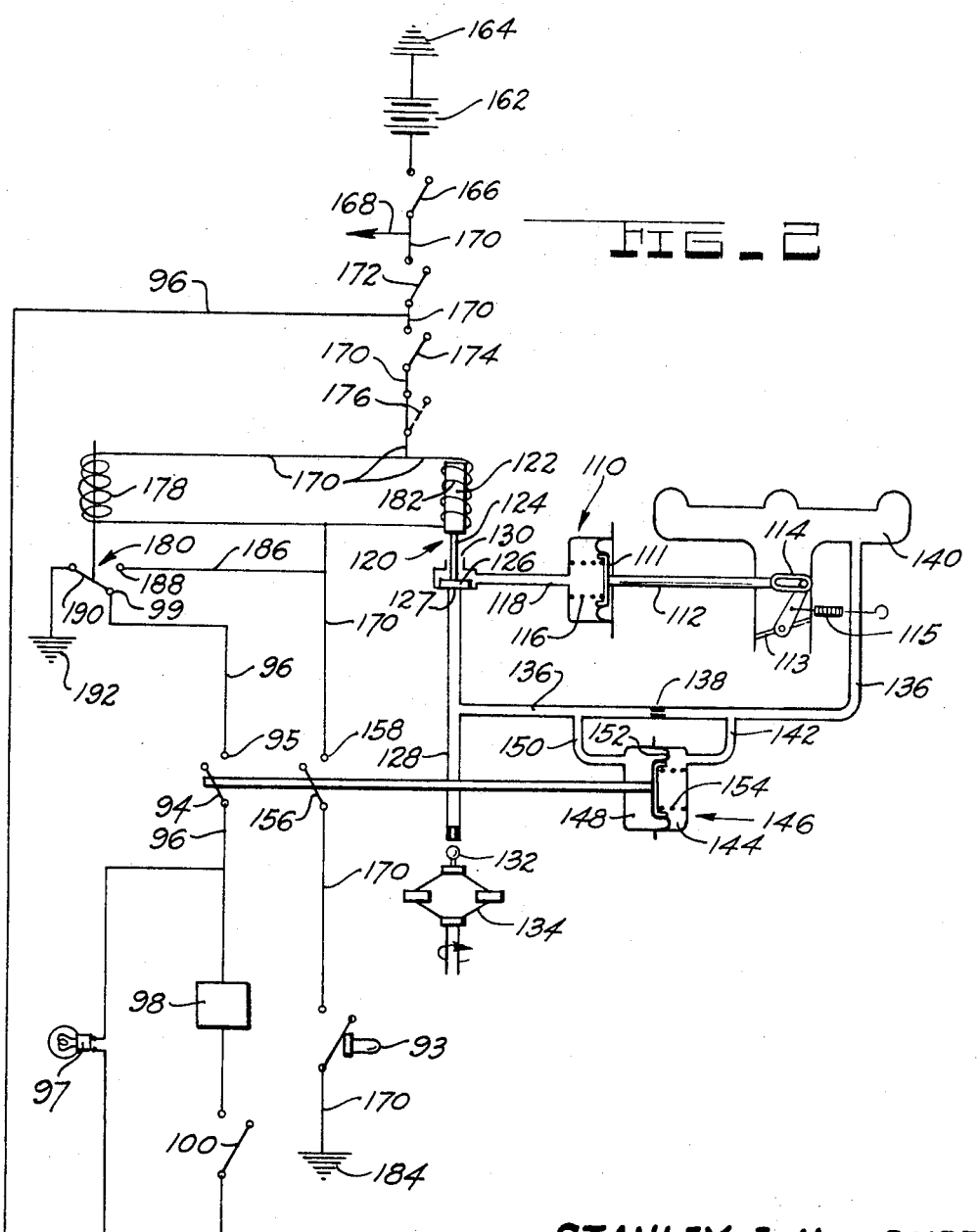

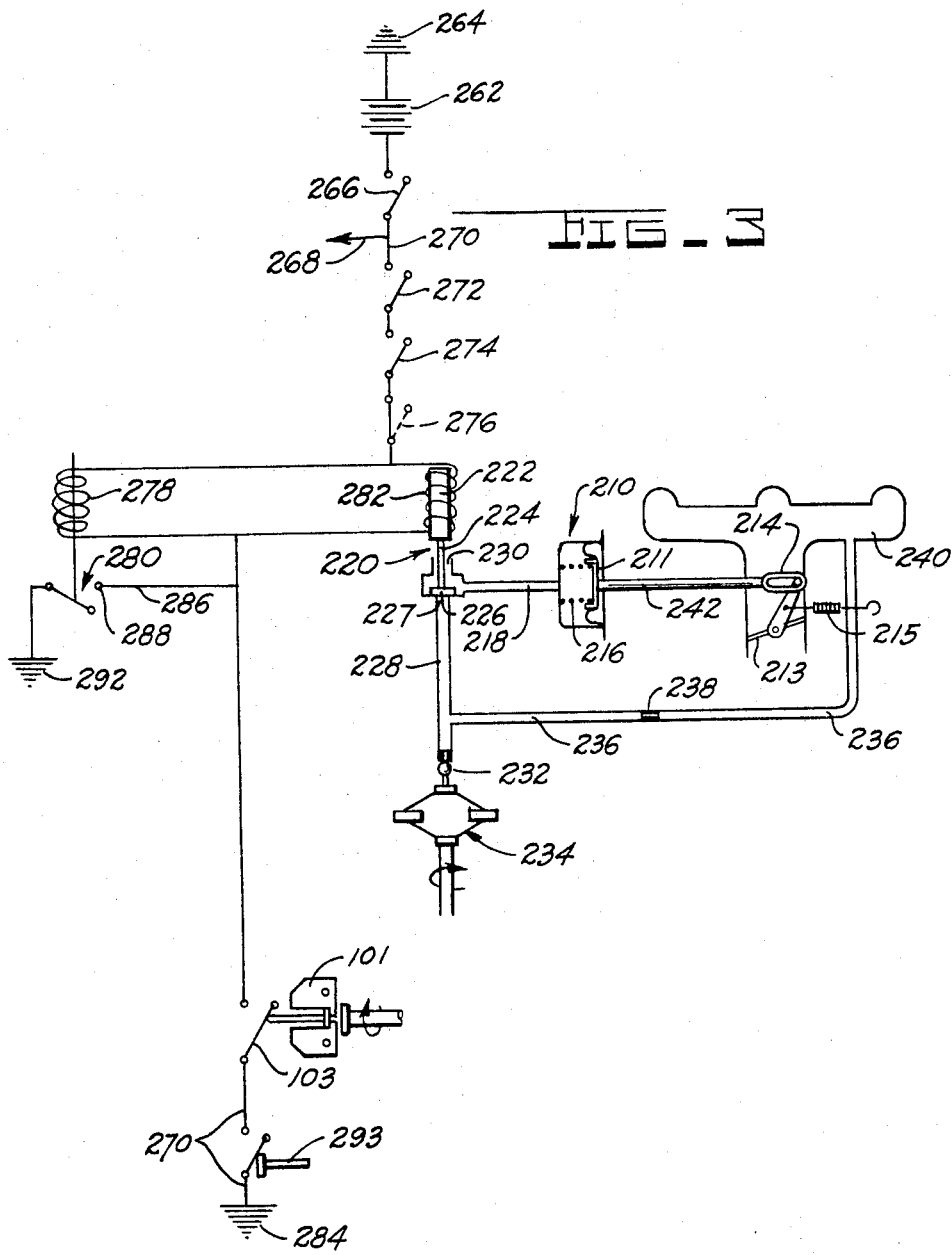

Aug. 23, 1966
S. I. MacDUFF ETAL
3,268,026
AUTOMOTIVE CRUISE CONTROL
Filed Dec. 26, 1962
7 Sheets-Sheet 4
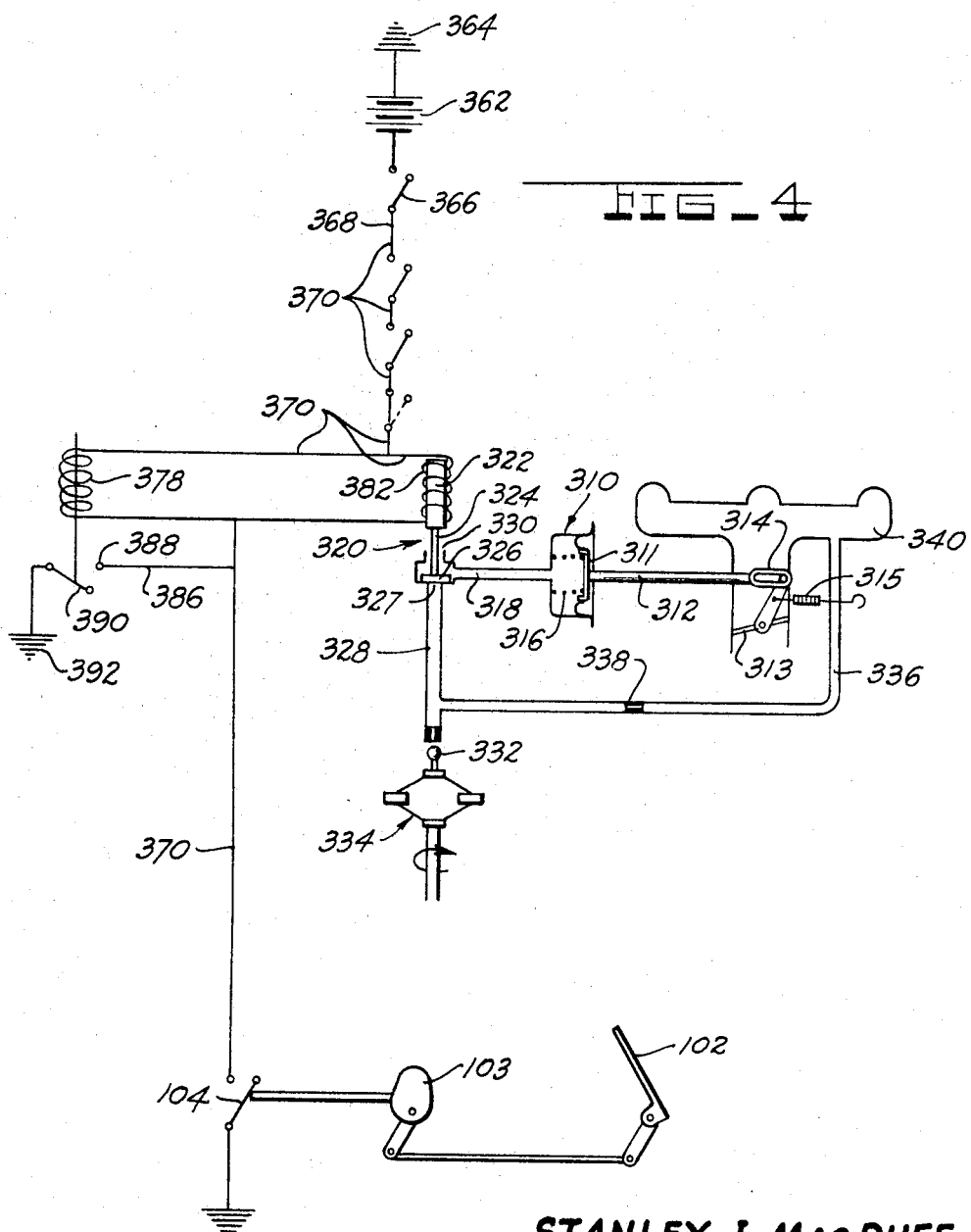
STANLEY I. MacDUFF.
WARD C. SUTTLE.
INVENTORS
BY William N. Antonis
ATTORNEY.

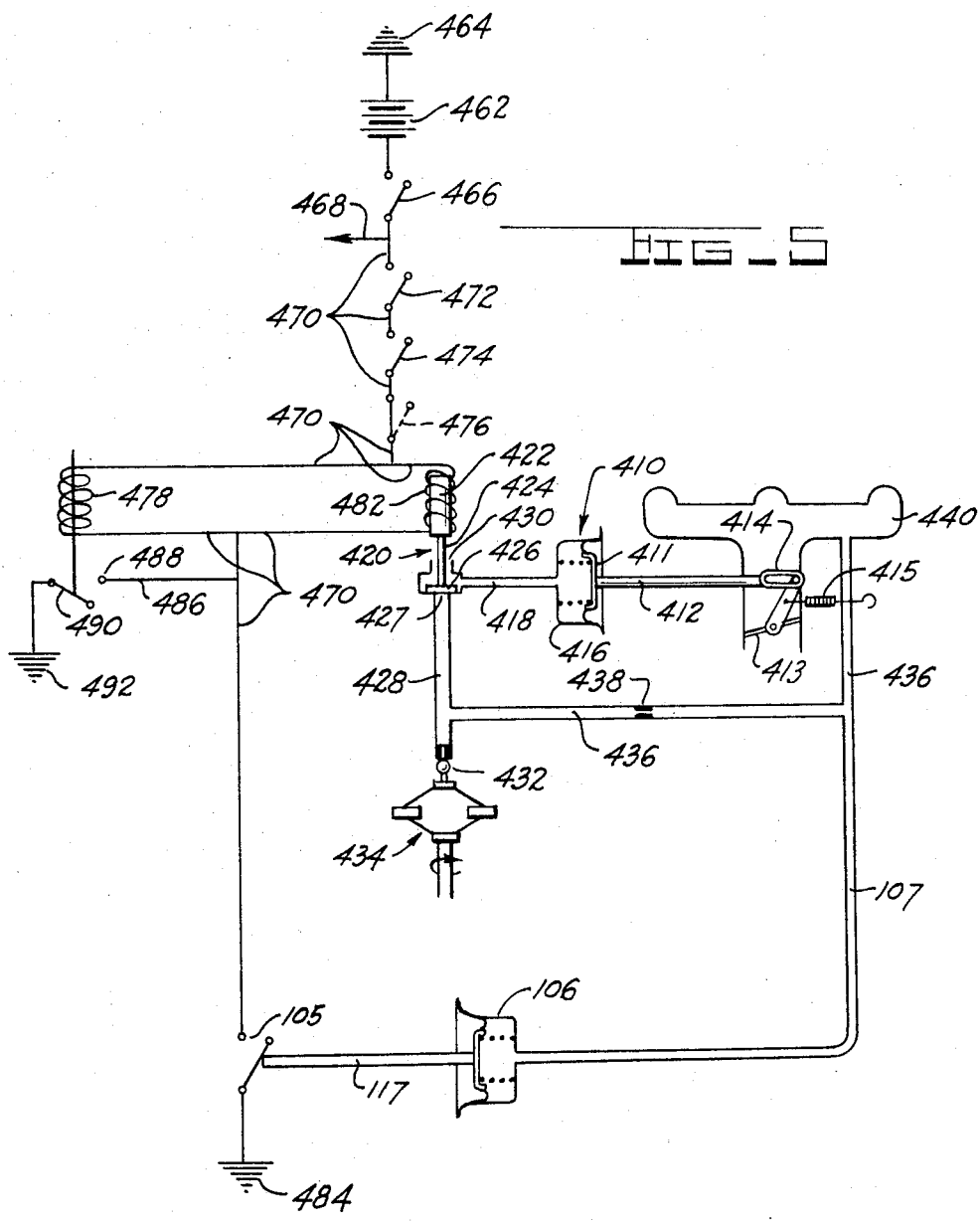

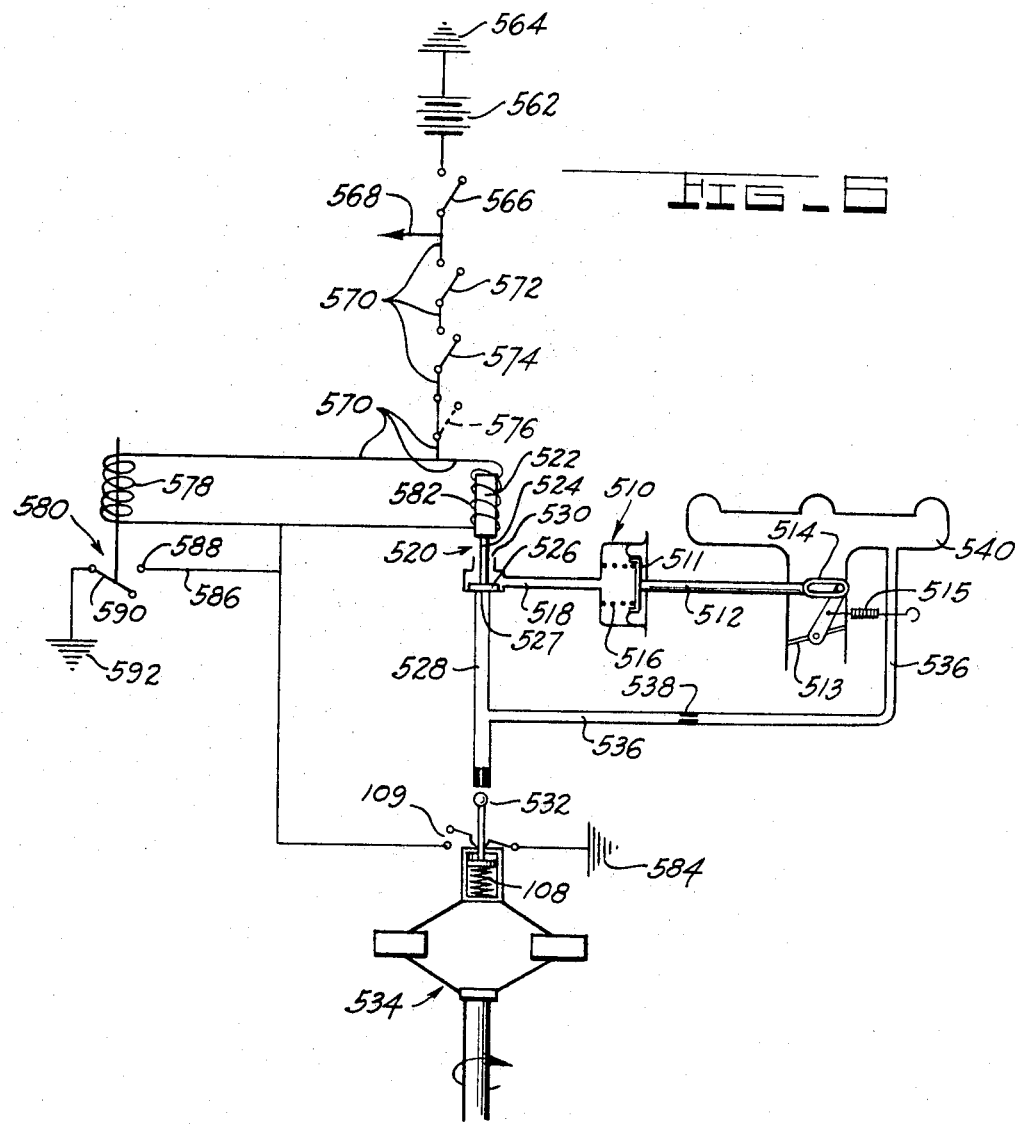

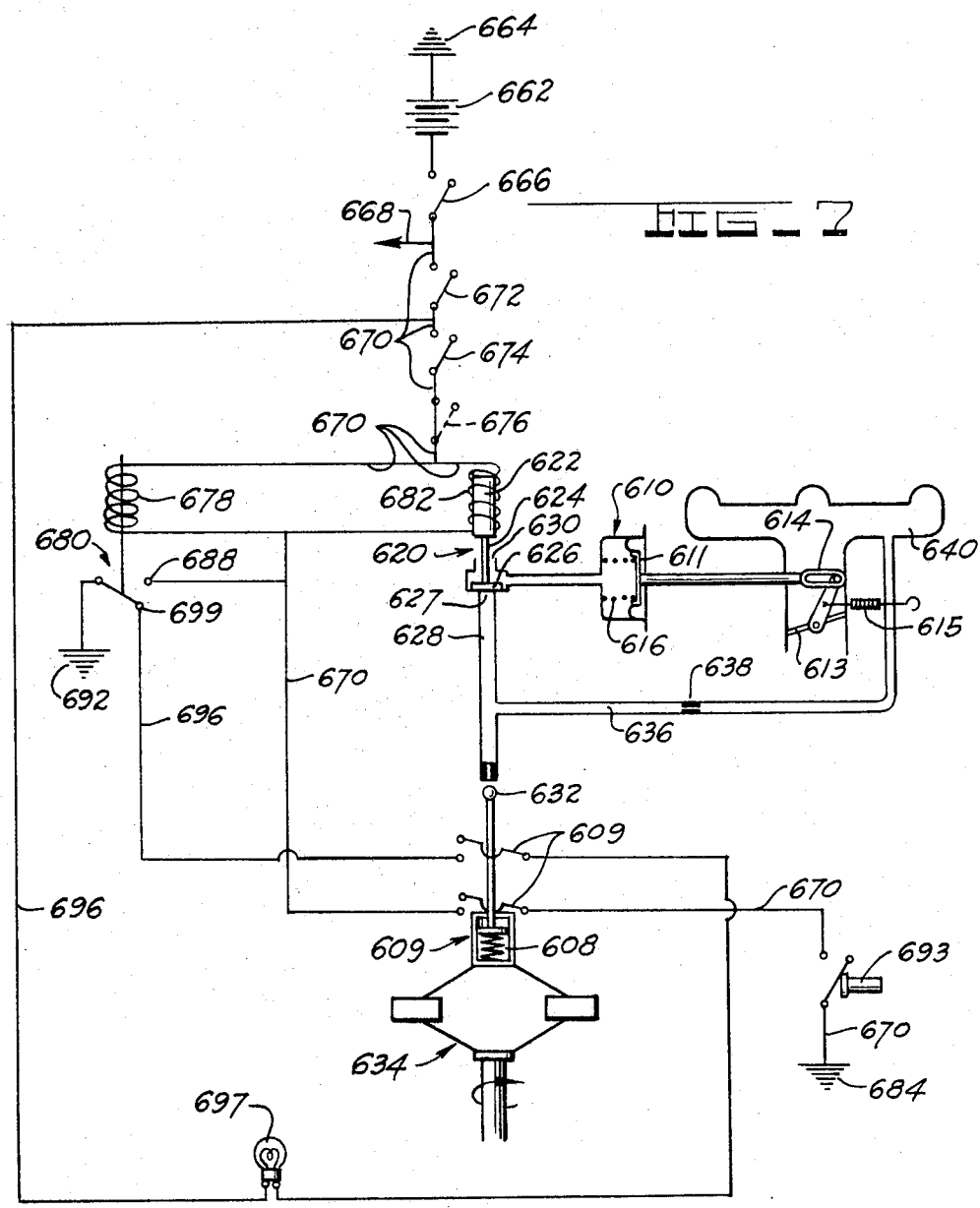

United States Patent Office 3,268,026
Patented August 23, 1966

3,268,026
AUTOMOTIVE CRUISE CONTROL
Stanley I. MacDuff and Ward C. Suttle, South Bend, Ind., assignors to The Bendix Corporation, South Bend, Ind., a corporation of Delaware
Filed Dec. 26, 1962, Ser. No. 247,227
1 Claim. (Cl. 180—82.1)

This invention relates to a cruise control system for automatically controlling the speed of an automotive vehicle and more particularly to improvements in a cruise control system of the type disclosed in our copending application Serial No. 184,073, filed April 2, 1962, now abandoned.

More specifically, it is one of the objects of this invention to provide a novel pneumatic speed control system which may be incorporated with various types of electrical control systems for rendering the speed control system operable.

Another object of this invention is to provide a speed control system which is not or cannot be rendered operable until the throttle control member is moved to a predetermined position.

A further object of this invention is to provide a speed control system which is automatically rendered operable after manually accelerating up to a predetermined set speed.

A still further object of this invention is to provide a speed control system which, if desired, can be rendered operable after manually accelerating up to a predetermined set speed only by a conscious manual step.

Another object of this invention is to provide a speed control system which will automatically be rendered operable when the vehicle has been manually accelerated to a speed less than the set speed at whcih time the speed control system will automatically accelerate the vehicle to the set speed and maintain said set speed.

Another object of this invention is to provide a speed control system which, if desired, provides a signal for indicating when a given speed has been reached, at which time a conscious manual step is required to render the speed control system operable.

Other objects of this invention are to provide a speed control system which may be incorporated into standard automotive vehicles without the necessity of changing driver reflexes or "feel" when the device is in operation; to provide means for quickly and easily setting any speed desired; to provide means for allowing the driver greater ease and freedom of movement; and to provide certain safety features.

Although our invention will be described as being operated by vacuum which is available in the intake manifold of present day automotive vehicle engines, other pressure fluids which are available in an auotomotive vehicle may also be utilized. For example, in a vehicle powered by a gas turbine engine, the controlling medium could be compressor pressure rather than manifold vacuum. Accordingly, when the term "fluid pressure" is referred to in the claim, it is intended that such expression be broad enough to cover any suitable fluid pressure which is available in vehicles of this character and to include vacuum.

The above and other objects, features, and advantages of the invention will become apparent from the following description taken in connection with the accompanying drawings which form a part of this invention and in which:

FIGURE 1 shows one embodiment of our speed control system in which the pneumatic and electrical components thereof are schematically and diagrammatically illustrated;

FIGURE 2 shows a second embodiment of our speed control system in which the pneumatic and electrical components thereof are schematically and diagrammatically illustrated;

FIGURE 3 shows a third embodiment of our speed control system in which the pneumatic and electrical components thereof are schematically and diagrammatically illustrated;

FIGURE 4 shows a fourth embodiment of our speed control system in which the pneumatic and electrical components thereof are schematically and diagrammatically illustrated;

FIGURE 5 shows a fifth embodiment of our speed control system in which the pneumatic and electrical components thereof are schematically and diagrammatically illustrated;

FIGURE 6 shows a sixth embodiment of our speed control system in which the pneumatic and electrical components thereof are schematically and diagrammatically illustrated; and FIGURE 7 shows a seventh embodiment of our speed control system in which the pneumatic and electrical components thereof are schematically and diagrammatically illustrated.

Referring to FIGURE 1, it will be seen that, although the speed control system, which is shown, is similar in many respects to that which was described and shown in our copending application Serial No. 184,073, now abandoned, it includes certain additional novel features. Specifically, the system consists of a vacuum power unit 10 having a throttle actuator diaphragm 11 therein, which is linked to the engine throttle 13 by rod 12 through a suitable lost motion connection 14. It will be noted that movement of rod 12 to the left will cause the throttle 13 to open and increase the fuel supply to the engine, such movement being against spring 15 which urges the throttle towards a closed position. A spring 16 urges the actuator diaphragm 11 to a throttle released position. The actuator diaphragm 11 has one side thereof continually open to atmosphere while the other side thereof is connected by a conduit 18 to a three-way solenoid valve, indicated generally by the numeral 20. The solenoid valve includes an armature 22 connected to a valve stem 24 on which is mounted a valve head 26. This valve has a vacuum port 27 connected to conduit 28 and an air port 30. Conduit 28 leads to a variable orifice 32 which is controlled by the wheel-driven all speed governor 34 and the modulating valve 35 attached thereto. A conduit 36 branches from conduit 28 and leads through a fixed orifice 38 to the engine intake manifold 40.

Solenoid valve 20 is designed so that when it is de-energized, the valve head 26 closes the vacuum port 27 (as shown) and opens air port 30 to conduit 18 and the power unit 10. When the solenoid is energized the valve head 26 opens the vacuum port 27 and closes air port 30, thereby communicating the power unit 10 with vacuum from the intake manifold. When the solenoid is de-energized, no pressure differential exists across actuator diaphragm 11 and the spring 16, therefore, urges rod 12 to the throttle closed position. At such times manual operation of the throttle 13 is not impeded due to the lost motion connection on the link.

It will be noted that the servo control system comprising fixed orifice 38, conduit 36, conduit 28 and governor variable orifice 32 will remain functional at all times during vehicle operation and the pressure in conduit 28 will be regulated in accordance with the existing governor setting, said governor setting being adjustable in the manner disclosed in our copending application Serial No. 184,073. Thus, whenever the vehicle speed is below the governor setting, the variable orifice 32 will be closed by modulating valve 35 and manifold pressure will exist in conduit 28. If the speed of the vehicle increases and passes the governor preset speed setting, the modulating valve 35 will move away from the variable orifice 32 and the pressure in conduit 28 will increase (vacuum will decrease) since this conduit will be put in communication with the atmosphere. At some speed slightly above the governor setting, the governor valve will be wide open and the pressure in conduit 28 will approach atmospheric pressure and will be substantially higher than manifold pressure. However, these variations in pressure will not affect the throttle as long as solenoid valve 20 is not energized. When the solenoid valve 20 is energized, it will open vacuum port 27 to the power unit 10 and will close the air port 30. In this condition, the system will regulate the vehicle speed in a manner to be subsequently described.

The control for the previously described pneumatic system includes a conduit 42, one end of which communicates with a chamber 44 of a differential pressure switch 46 and the other end of which communicates with conduit 36 at a point between fixed orifice 38 and the intake manifold 40. The other chamber 48 is connected by a conduit 50 to conduit 36 on the other side of the fixed orifice, namely between variable orifice 32 and fixed orifice 38. A diaphragm 52 separates the chambers 44 and 48 and is urged by a spring 54 away from electrical switch contacts 56 and 58 which are positioned in the wall of chamber 44 and are adapted to be interconnected by contact with the diaphragm support plate 60 when a sufficient pressure difference exists across the diaphragm to compress the spring. It will be understood that when the vehicle speed approaches the governor set speed and modulating valve 35 moves away from variable orifice 32 so as to begin to admit air into conduit 28, a pressure difference will be established across fixed orifice 38 sufficient to actuate the pressure switch 46.

Referring now to the wiring circuit of FIGURE 1, it will be noted that it includes a battery 62 having one terminal grounded at 64 and having the other terminal connected to an ignition switch 66. Other circuits lead from the ignition switch and are indicated generally by line 68. A cruise control circuit line 70 also leads from the ignition switch 66 to an "on"-"off" switch 72 located in the driver's compartment and conveniently made a part of any suitable speed setting control such as shown in Denman et al. Patent No. 2,936,647, so that it will be in an "on" position when the speed selector is moved to any given selected speed position. Circuit 70 continues in series through a shift interlock switch 74 which is open in the park, neutral, and reverse positions but is closed in the drive positions, and a brake switch 76 which is normally closed but is opened upon application of the brakes. Although the shift interlock switch is defined in terms of automatic transmission gear shift settings, it will be understood by those skilled in the art that certain adaptation in the control circuit would permit the use of our invention in an automobile which does not have an automatic transmission.

From the brake switch, circuit 70 branches and passes in parallel through coil 78 of a normally open holding relay switch 80 and the coil 82 of the solenoid valve 20. Circuit 70 continues beyond these coils to contact 58 of the differential pressure switch and thence from contact 56 to ground at 84. A branch circuit 86 leads from circuit 70 to contact 88 of the relay switch and from pole 90 of the relay switch to ground at 92.

Operation of this speed control system will be as follows: After a governor speed setting is made and the "on"-"off" switch 72 is closed, the vehicle is set in motion in forward drive so that the ignition and interlock switches 66 and 74 are also closed, and the vehicle has been accelerated under manual control to the set speed, the differential pressure switch 46 operates to close its contacts. When this occurs a circuit is automatically established through the solenoid valve 20 so that it will become energized and thus permit the communication of vacuum from the intake manifold to the power unit 10 via vacuum port 27. This will create a pressure differential across actuator diaphragm 11 of sufficient magnitude to permit regulation of the throttle and maintenance of a substantially uniform vehicle speed until the circuit is broken. The holding relay switch 80 is energized simultaneously and closes contacts 88 and 90 to provide a permanent ground for circuit 70 regardless of what may subsequently happen to the differential pressure switch 46. Thereafter, if at any time the driver operates his brakes or turns off the ignition or moves the shift control out of forward drive, the relay switch 80 will open and the solenoid valve 20 will shift, so as to admit air to the actuator unit 10 and permit closure of the throttle 13. If this condition persists for even a brief period of time, the vehicle will decelerate sufficiently below set speed so that the governor modulating valve 35 will close variable orifice 32, thereby stopping flow of air through the fixed orifice 38 and eliminating the pressure difference across this orifice. When this pressure differential is eliminated, pressure differential switch 46 will open immediately and any subsequent reclosing of the switch (i.e. ignition, brake, or interlock switch) which was opened to initiate this action will have no effect to restore the cruise control to governing condition and it will be necessary, as before, to manually accelerate the vehicle to set speed before the differential pressure switch 46 closes once again and automatically locks in the speed control system.

If, in ascending a sufficiently steep grade, the throttle is opened sufficiently to drop the manifold pressure to the point where it equals the required pressure to operate the throttle actuator 11 at that throttle position, it will be obvious that flow through orifice 38 will cease and the pressure differential switch will open. However, as long as relay switch 80 is closed, the system will remain operative, except that it will be unable to maintain set speed on the hill. Once the grade has been climbed and the vehicle is on a level road again, it will of course accelerate to set speed and continue to govern as before. It is, of course, obvious that if the vehicle is on a steep downgrade, the governor valve 32 will open sufficiently to supply nearly atmospheric pressure to the actuator, thereby permitting the throttle to close fully. If engine braking at fully closed throttle is not sufficient to hold the vehicle at the set speed, it will over speed until sufficient engine braking is developed to limit the vehicle speed. If the hill is exceedingly steep, it may be necessary for the driver to apply his brakes or shift to "low" gear as he normally would if there were no cruise control. This will open circuit 70 and cause the solenoid valve 20 to shift, but as long as vehicle speed is at or above set speed, release of the brake, or shifting back to "drive" will restore operation of the cruise control system. If this is considered undesirable, the driver should either move the "on"-"off" switch to its "off" position, or else shift the speed setting unit to its maximum speed, which would normally be above the speed at which the vehicle will be operating.

FIGURE 2 illustrates a system similar to that which was described in connection with FIGURE 1, except that it is necessary, after normally accelerating to set speed, to push a push button in order to lock in the cruise control circuit. A signal light and a buzzer, or similar audible warning device, are incorporated into this circuit to provide notice to the driver that the set speed is attained. When driving in traffic, it may not be desirable to lock in the speed control, but the "on"-"off" switch may be moved to "on" and the speed control set at the applicable speed limit whereupon the warning devices may be utilized by the driver to avoid operating in excess of the speed limit. All parts in FIGURE 2, which are the same as those in FIGURE 1, are identified by the same numerals plus 100, and such parts will not be described a second time. It will be noted that circuit 170 now contains a push button switch 93. The pressure differential switch 148 has been modified to include another pair of contacts 94 and 95, which are positioned in a circuit 96 branching from circuit 170 between the switches 172 and 174. This circuit passes in parallel through a dash-mounted signal light 97 and a buzzer 98, thence through contacts 94 and 95 to a contact 99 which constitutes a normally closed switch circuit in relay 180 and thence to ground at 192. A buzzer shut-off switch 100 is placed in series with the buzzer.

The system of FIGURE 2 functions in essentially the same manner as the system of FIGURE 1, except that when the set speed is attained and the differential pressure switch 146 closes, the only circuit that is completed is circuit 96. Completion of this circuit causes the signal light 97 to light up and, if switch 100 is closed, causes the buzzer 98 to operate. If the driver then pushes the push button switch 93, circuit 170 will be completed and the system will control speed automatically until interrupted in one of the ways previously described. However, once operation is interrupted, it cannot be restored until the vehicle has again been brought to the set speed which activates the signals, at which time the push button 93 must be pushed once again. Use of the system as a simple speed warning device will be obvious to those skilled in the art.

FIGURE 3 illustrates a system similar to that which was described in connection with FIGURE 2, except that the vacuum differential pressure switch has been eliminated and an additional wheel driven governor 101 and switch 103 substituted in place thereof. This system requires that the vehicle be manually accelerated to some predetermined speed (preferably the lowest speed at which it is desired to have the automatic speed control work) and then the push button 293 must be pushed. The vehicle will then be automatically accelerated to set speed and controlled there until interrupted in the usual way. If the vehicle is in motion above the aforesaid predetermined speed, the button may be pressed at any time to initiate automatic control. In this figure like parts are identified by the same numerals as in FIGURE 1 plus 200. The wheel driven governor switch 103 is connected in series with the push button 293 in circuit 270.

In FIGURE 4, those parts which are the same as those in FIGURE 1 are identified by the same numerals plus 300. The system illustrated by this figure is such that when the "on"-"off" switch is "on" and the vehicle is in forward drive with the engine running, the speed control can be locked in by opening the throttle a predetermined fixed amount. This is accomplished by providing a normally open control switch 104 in circuit 370 which will be closed by a suitable cam 103 linked to the throttle treadle or accelerator pedal 102. The linkage between the accelerator pedal 102 and throttle 313 is not shown since it is conventional. The rise in the cam which actuates the switch can be positioned at any desired point in the movement of the accelerator pedal. This system will be deactivated in any of the usual methods (i.e. by applying the brakes, shifting to a position other than "drive," turning the "on"-"off" switch to "off," or opening the ignition switch). In cases other than turning the "on"-"off" switch to "off," the system will be reactivated by opening the throttle to the predetermined position.

FIGURE 5, in which like parts of FIGURE 1 are identified by like numerals plus 400, illustrates a system which in many respects is similar to the system of FIGURE 4. In this system a switch 105, which is operated by a rod 117 operatively connected to a spring-loaded vacuum cylinder 106, is connected into circuit 470. A conduit 107 connects the vacuum cylinder 106 to the intake manifold 440. If the system is prepared for operation in the usual way, opening the throttle 413 sufficiently to reduce manifold vacuum to the point where the diaphragm and spring in the vacuum cylinder 106 will move in a direction which will close switch 105, will complete circuit 470 and place the vehicle under automatic cruise control. Actual behavior of the system will be much the same as that of FIGURE 4, except that the exact point of operation will vary somewhat with vehicle speed.

FIGURE 6 illustrates a system whose function is analogous to that of FIGURE 1, except that it will lock in the cruise control system after the vehicle has been manually accelerated to a speed less than the set speed. Components which are the same as those of FIGURE 1 are identified by the same numerals plus 500. The function just described is accomplished by modifying the structure of the governor 534 to include a lost motion element 108 between the governor weight structure and the governor valve 532. This lost motion is utilized to mechanically actuate a switch 109 which is connected into circuit 570, in place of the pressure differential switch 46 of FIGURE 1. Thus, this lost motion connection permits over-travel in the governor so that control switch 109 will close before governor valve 532 is opened. Other conditions being the same, as the vehicle is accelerated toward the set speed, the switch 109 will close, completing circuit 570, and causing the cruise control to automatically take over the control of the speed of the vehicle. This system has the unique characteristic that a brake application (or other circuit interruption) will cause the cruise control to cease functioning only temporarily if the brake is released or the circuit re-established before the vehicle decelerates to the speed at which switch 109 will open. This has the advantage that slight reductions in speed can be made in order to avoid some traffic interference without the necessity for doing anything to re-establish cruise control function other than release the brake.

FIGURE 7 is a system similar to that of FIGURE 6, except that the circuitry is modified to include a push button 693 and a signal light 697. Like parts are designated by like numerals plus 600. The governor contains the same type of lost motion element 608 as that of FIGURE 6, which permits the governor to first operate a double pole, double throw switch 609 prior to opening the governor air valve 632. One pole of switch 609 closes the signal light circuit 696 to inform the driver that the cruise control system is in a condition to be locked in. The other pole of switch 609 is connected in circuit 670 in series with the push button switch 693 so that, after the switch 609 closes and signal light 697 lights up, if the push button is pushed, the cruise control system will lock in and control the speed of the vehicle.

Although this invention has been described in connection with a power unit which utilizes vacuum as a power souce, any fluid pressure source may be used which varies as a function of the movement of the throttle control member. Furthermore, even though this invention has been described in connection with certain specific embodiments, it will be obvious to those skilled in the art that various changes may be made in the form, structure, and arrangement of parts without departing from the spirit of the invention. Accordingly, we do not desire to be limited to the specific embodiments disclosed herein primarily for purposes of illustration, but instead desire protection falling within the scope of the appended claim.

Having thus described the various features of the invention, what we claim as new and desire to secure by Letters Patent is:

In an automotive vehicle having an engine and a driver operated throttle control member for controlling the fuel supply to the engine, a vacuum power unit having a pressure responsive element located therein, said pressure responsive element being operatively connected to said throttle control member for regulating and controlling movement thereof, first passage means for communicating vacuum from the intake manifold of said engine to one side of said pressure responsive element, said vacuum varying as a function of the movement of the throttle control member, first valve means located in said first passage means and operatively connected to said power unit, said valve means having a first position for communicating atmospheric pressure to the vacuum side of said pressure responsive element and a second position for preventing communication therebetween, solenoid means operatively connected to said first valve means for causing movement thereof from one position to the other independently of vehicle speed, second passage means for communicating atmospheric pressure to the vacuum side of said pressure responsive element when said first valve is in said second position, modulating valve means interposed in said second passage means for regulating the degree of communication between the atmosphere and the vacuum side of said pressure responsive element via said second passage means, means responsive to vehicle speed operatively connected to said modulating valve for controlling movement thereof, a fixed orifice located in said first passage means between the intake manifold and said modulating valve, a second vacuum unit having a pressure responsive member located therein, passage means for communicating one side of said pressure responsive member with the upstream side of said orifice and the other side of said pressure responsive member with the downstream side of said orifice, and an electrical circuit for energizing said solenoid means, said circuit including in series an ignition switch which is closed upon turning of the ignition key, a shift interlock switch which is open in the park, neutral and reverse positions but is closed in the drive position, a speed selector switch which is open when the selector is in the "off" position but is closed when the selector is moved to any given selected speed position, a brake switch which is normally closed but is opened upon application of the brakes, and a speed responsive switch operatively connected to the pressure responsive member of said second vacuum unit and closable by movement of said pressure responsive member, and a holding switch in parallel with said speed responsive switch for holding said solenoid mean energized after said speed responsive switch has opened.

References Cited by the Examiner
UNITED STATES PATENTS

| | | | |
|---|---|---|---|
| 2,157,472 | 5/1939 | Bellis | 180—82.1 X |
| 2,936,647 | 5/1960 | Denman et al. | 74—471 |
| 2,990,825 | 7/1961 | Fuller et al. | 180—82.1 |
| 3,062,312 | 11/1962 | Dietrich et al. | 180—82.1 |
| 3,077,239 | 2/1963 | Simas | 180—82.1 |
| 3,081,837 | 3/1963 | Fiteny | 180—82.1 |
| 3,092,090 | 6/1963 | Berninger | 180—82.1 X |
| 3,185,248 | 5/1965 | Baxter | 180—82.1 |

KENNETH H. BETTS, *Primary Examiner.*

A. HARRY LEVY, PHILIP ARNOLD, BENJAMIN HERSH, *Examiners.*

E. E. PORTER, *Assistant Examiner.*